M. LAUX.
JUNCTION BOX.
APPLICATION FILED DEC. 20, 1909.

970,377.

Patented Sept. 13, 1910.

2 SHEETS—SHEET 1.

Witnesses:
Samuel Payne
K. H. Butler

Inventor:
M. Laux
by
Attorneys.

THE NORRIS PETERS CO., WASHINGTON, D. C.

M. LAUX.
JUNCTION BOX.
APPLICATION FILED DEC. 20, 1909.
970,377.
Patented Sept. 13, 1910.
2 SHEETS—SHEET 2.
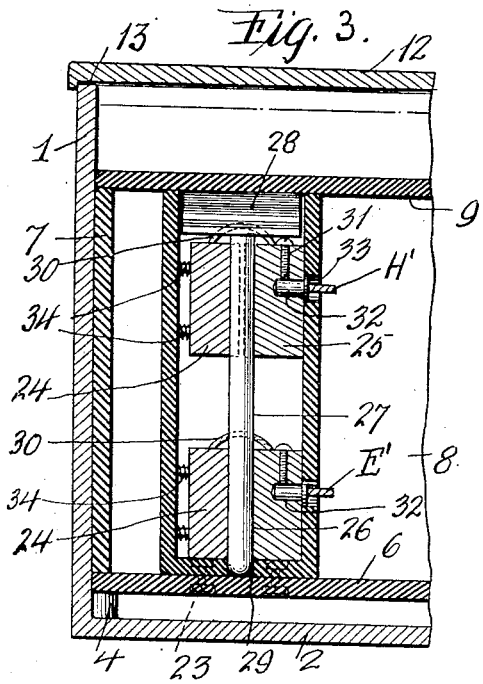
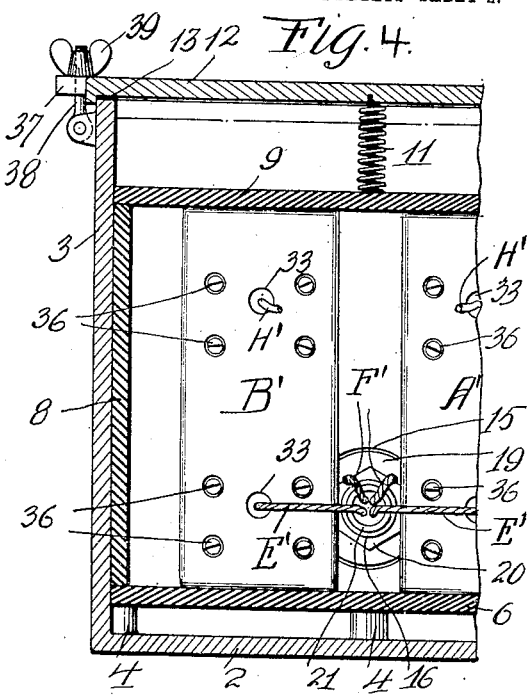
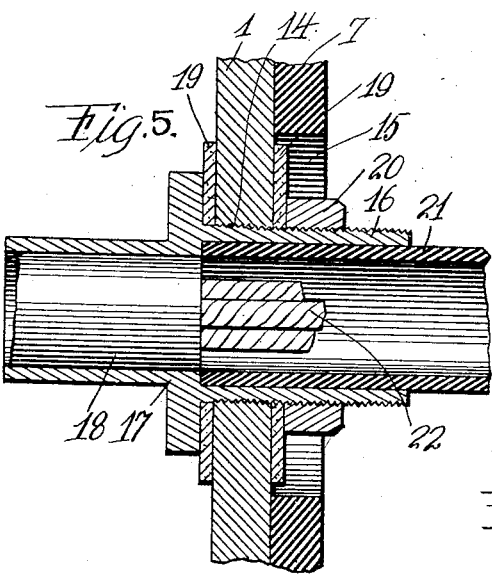
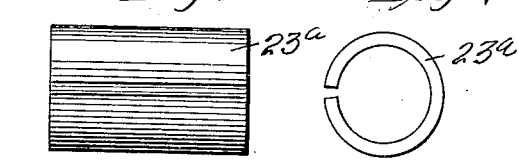
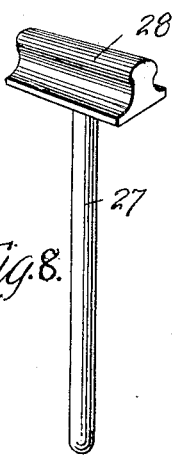
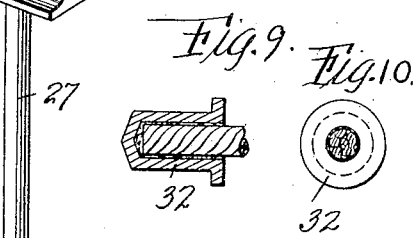
Witnesses:
Samuel Payne
X. H. Butler
Inventor
M. Laux
by Attorneys

UNITED STATES PATENT OFFICE.

MICHAEL LAUX, OF PITTSBURG, PENNSYLVANIA.

JUNCTION-BOX.

970,377.  Specification of Letters Patent.  Patented Sept. 13, 1910.

Application filed December 20, 1909. Serial No. 534,093.

*To all whom it may concern:*

Be it known that I, MICHAEL LAUX, a citizen of the United States of America, residing at Pittsburg, in the county of Allegheny and State of Pennsylvania, have invented certain new and useful Improvements in Junction-Boxes, of which the following is a specification, reference being had therein to the accompanying drawing.

This invention relates to junction boxes that can be used on eleven hundred to thirteen hundred volts alternating current, either single phase, three phase three wire, three phase four wire, two phase four wire, or one hundred to six hundred volts direct current.

My invention aims to provide a junction box that will permit of repairs being easily and quickly made without shutting off or interrupting the currents in main supply cables or branches thereof. To this end, I devise a junction box that is simple in construction, durable, inexpensive to manufacture, easily installed, and highly efficient for the purposes for which it is intended.

My invention will be hereinafter specifically described and then claimed, and reference will now be had to the drawings forming a part of this specification, wherein there is illustrated a preferred embodiment of the invention, but it is to be understood that the structural elements thereof can be varied or changed, as to the size, shape and manner of assemblage, without departing from the spirit and scope of the invention.

Figure 1:
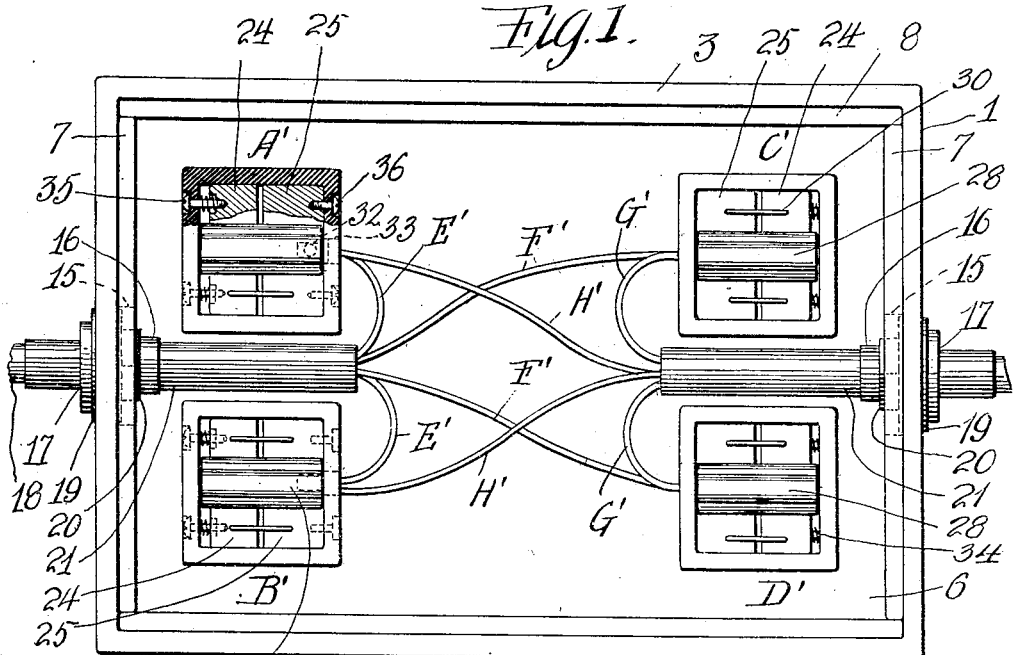
Figure 2:
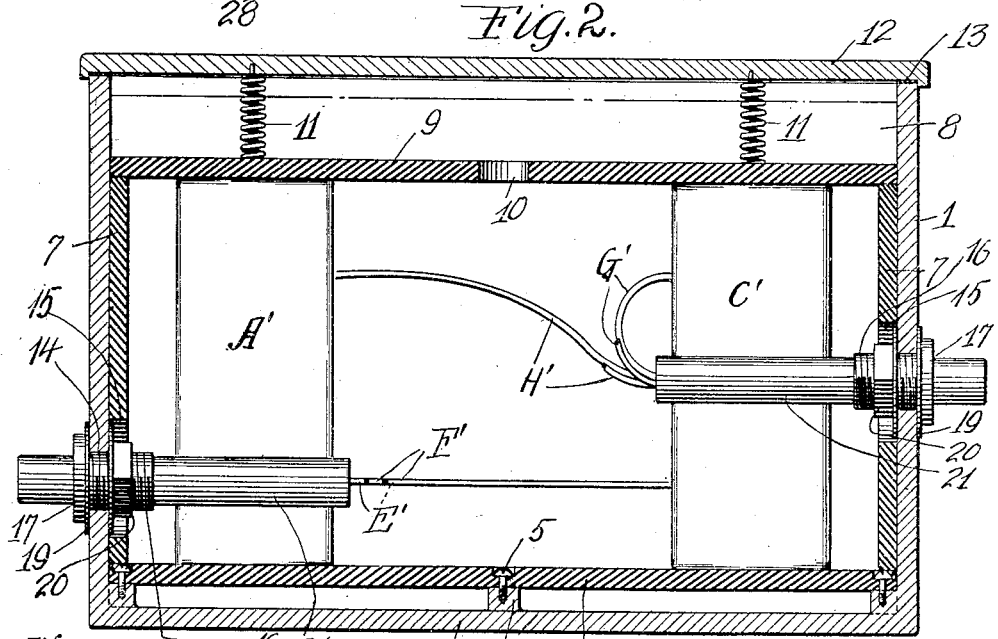

In the drawings:—Figure 1 is an enlarged plan of a junction box with the lid thereof removed and one of the cells partly broken away and partly in section. Fig. 2 is a longitudinal sectional view of the same. Fig. 3 is a vertical longitudinal sectional view of a portion of the box showing one of the cells thereof in section. Fig. 4 is a similar view of the box showing one of the cells thereof in elevation. Fig. 5 is an enlarged vertical sectional view of a portion of the box illustrating a cable entry. Fig. 6 is a side elevation of a split sleeve adapted to be used in connection with small cables. Fig. 7 is an end view of the same. Fig. 8 is a perspective view of a metallic plug adapted to form part of the box. Fig. 9 is a longitudinal sectional view of a terminal plug, and Fig. 10 is an end view of the same.

My invention aims to install at various points throughout the streets junction boxes, one of which can be located upon the main cable, and others located upon branch cables extending into side streets. It is through the medium of these junction boxes that I am enabled to shut off certain parts of circuits, make repairs any time, without making wiped joints. I am also enabled to shut off certain circuits in side streets without affecting the main circuit, thereby eliminating Sunday and night work. Furthermore, I can discover short circuits without necessarily shutting off the main circuit. It is with this understanding of my invention that reference will now be had to the detail construction of one of the junction boxes.

Each box comprises a rectangular metallic casing having end walls 1, a bottom plate 2 and side walls 3. The bottom plate 2 is provided with transverse ribs 4 and suitably secured to these ribs, for instance by screws 5, is the bottom plate 6 of an insulating shell mounted within the casing, the shell being preferably made of porcelain or other non-conductive material. The shell includes the bottom plate 6, end walls 7, side walls 8 and a detachable cover 9, the cover resting upon the upper edges of the walls 7 and 8. The cover is provided with a central opening 10 and is connected by a plurality of coiled springs 11 to a lid 12 adapted to fit upon the upper edges of the walls 1 and 3; a gasket or washer 13 being interposed between the confronting surfaces of the walls 1 and 3 and the lid 12. The cover 9 is connected to the lid 12 in the manner just described in order that when the lid 12 is removed, the cover 9 will be carried with said lid.

The walls 1 and 7 are provided with openings 14 and 15 respectively, the latter being of a greater diameter than the former, but communicating therewith. The walls of the opening 14 are threaded to receive the exteriorly threaded tubular extension 16 of a coupling piece 17 adapted to provide an entry for a cable 18 to the junction box. The coupling piece 17 is retained in engagement with the wall 1 by washers 19 and a nut 20, the washers being preferably made of lead. The cable 18 terminates at the tubular extension 16 and fitted within said extension is a sleeve 21 of an insulating material, as porcelain or rubber, and into this sleeve branches the leading-out wires 22 of the cable 18. Should the cable 18 be of a less diameter than that shown, a split sleeve 23 can be fitted upon the small cable, whereby it will be held in engagement with the coupling piece 17. The entry of the cable at one end of the junction box is located above the entry of the cable at the opposite end thereof, as best shown in Fig. 3 of the drawings, whereby the leading-out wires of each cable can be readily connected to their respective elements within the junction box.

Within the junction box secured to the bottom plate 6 of the insulated shell by bolts 23 or other fastening means are a plurality of rectangular vertical cells adapted to extend from the bottom plate 6 to the cover 9, said cover closing the upper ends of said cells. It is preferable to use two sets of these cells, one set adjacent to each of the sleeves 21 and upon opposite sides of said sleeves, whereby the leading-out wires 22 of the cables 18 can be easily connected to the cells. For the convenience of describing these cells, I have designated the cells A', B', C', and D', and each cell is adapted to contain two sets of contact plugs, one arranged above the other, each set comprising blocks 24 and 25 having the confronting faces thereof provided with vertical grooves 26 adapted to receive a metallic cylindrical plug 27. This plug is provided with a head 28 and the lower end thereof is adapted to extend into an opening 29 provided therefor in the bottom of the cell. The blocks 24 and 25 of each set are movably connected by resilient arms 30 extending into the upper faces of the blocks, at opposite sides of the plug 27. Held in engagement with the blocks 25 by screws 31 or other fastening means are the terminal plugs 32 of certain leading out wires of the cables 18, said plugs extending through openings 33 provided therefor in the front wall of each cell. The blocks 24 are frictionally held in engagement with the plugs 27 by coiled springs 34 encircling screws 35 loosely mounted in the rear wall of each cell, the arrangement of these screws being best shown in Fig. 1. The blocks 25 are fixed relative to the front wall of each cell by set screws 36.

The manner of connecting the leading-out wires 22 to the blocks 25 of each cell is best shown in Fig. 1 of the drawings. Two of the cables designated E' are connected to the lowermost blocks 25 of the cells A' and B', and the cables designated F' extend across the box and are connected to the lowermost blocks 25 of the cells C' and D'. The cables designated G' are connected to the uppermost blocks of the cells C' and D' and the cables designated H' extend across the box and are connected to the uppermost blocks 25 of the cells A' and B'.

The junction box is adapted to be filled with oil to the height indicated by dot and dash line, Fig. 2, and the opening 10 is provided in the cover 9 whereby the oil above the cover can commingle with the oil within the insulated shell.

The lid 12 can be hinged at one end and fastened at the opposite end, or the edges of the lid can be provided with bifurcated lugs 37 adapted to receive pivoted bolts 38 carried by the outer sides of the walls 1 and 3 adjacent to the upper edges thereof, the bolts 38 being held in engagement with the lid 12 by wing thumb-nuts 39.

To determine short circuits, it is only necessary that the terminal plugs be pulled upon different junction boxes until the short circuited section is found, and in this manner trouble can be located without necessitating the cutting off of a main supply circuit while repairs are being made.

Having now described my invention what I claim as new, is:—

1. A junction box comprising a casing, an insulated shell arranged within said casing, cable entries carried by the ends of said casing and shell, two pairs of insulated cells located in said shell, pairs of contact blocks arranged in each of said cells and one of the blocks of each pair having the entry cables detachably-connected thereto, means for connecting the blocks of each pair together, and a plug electrically connecting the pairs of blocks of each cell together.

2. A junction box comprising a casing, an insulated shell arranged within said casing, cable entries carried by the ends of said casing and shell, two pairs of insulated cells located in said shell, pairs of contact blocks arranged in each of said cells and one of the blocks of each pair having the entry cables detachably-connected thereto, means for connecting the blocks of each pair together, a plug electrically connecting the pairs of blocks of each cell together, means engaging a block of each pair for maintaining the blocks of each pair in contact with said plug, and means for fixedly securing the other block of each pair to the wall of a cell.

3. A junction box comprising a casing, pairs of insulated cells located within said casing, cable entries projecting through the ends of the casing, one of said entries arranged above the other, pairs of contact blocks arranged in each of the cells and one of the blocks of each pair having entry cables detachably-connected thereto, means for connecting the blocks of each pair together, and a plug electrically connecting the pairs of blocks in each cell together.

4. A junction box comprising a casing, pairs of insulated cells located within said casing, cable entries projecting through the ends of the casing, one of said entries arranged above the other, pairs of contact blocks arranged in each of the cells and one of the blocks of each pair having entry cables detachably-connected thereto, means for connecting the blocks of each pair together, a plug electrically-connecting the pairs of blocks in each cell together, resilient means arranged within the cells and engaging a block of each pair for maintaining the blocks of the pair against said plug, and means for fixedly securing the other block of each pair to a wall of its respective cell.

In testimony whereof I affix my signature in the presence of two witnesses.

MICHAEL LAUX.

Witnesses:
 KARL H. BUTLER,
 JOHN STEVENSON.